United States Patent [19]

Hansen

[11] Patent Number: 4,602,687
[45] Date of Patent: Jul. 29, 1986

[54] DRIVE MECHANISM FOR TURF AERATING APPARATUS

[75] Inventor: Loren F. Hansen, Lincoln, Nebr.

[73] Assignee: Outboard Marine Corporation, Waukegan, Ill.

[21] Appl. No.: 691,846

[22] Filed: Jan. 16, 1985

[51] Int. Cl.⁴ .............................................. A01B 45/02
[52] U.S. Cl. ....................................... 172/22; 172/125
[58] Field of Search ........................ 172/21, 22, 82, 84, 172/88, 95, 93, 101, 125; 111/89, 7, 6

[56] References Cited

U.S. PATENT DOCUMENTS

| | | | |
|---|---|---|---|
| 619,426 | 2/1899 | Mauger | 172/101 |
| 2,063,333 | 12/1936 | Nolte | 172/22 |
| 2,347,748 | 5/1944 | Melling | 172/21 |
| 2,800,066 | 7/1957 | Cohrs | 172/22 |

FOREIGN PATENT DOCUMENTS

| | | | |
|---|---|---|---|
| 8949 | of 1905 | United Kingdom | 172/21 X |
| 661287 | 11/1951 | United Kingdom | 172/21 |
| 1347967 | 2/1974 | United Kingdom | 172/21 |

Primary Examiner—Richard J. Johnson
Attorney, Agent, or Firm—John T. Synnestvedt; Richard D. Weber

[57] ABSTRACT

A mechanism for driving the upper ends of a pair of tine arms of a turf aerating apparatus comprises an engine-driven crank shaft having a pair of cranks extending in diametrically opposed relation therefrom. A pair of pitman arms are each pivotally connected at one end to the upper end of one of the tine arms and at the opposite end to an oscillating link suspended from the aerator frame. A crank is pivotally connected to each of said pitman arms at a point intermediate its end attachment points. Rotation of the crank shaft produces an elliptical motion of each of the tine arm upper ends with the major axis of the ellipse lying in a substantially vertical plane, thereby maintaining a substantially vertical attitude of the tine arms.

2 Claims, 13 Drawing Figures

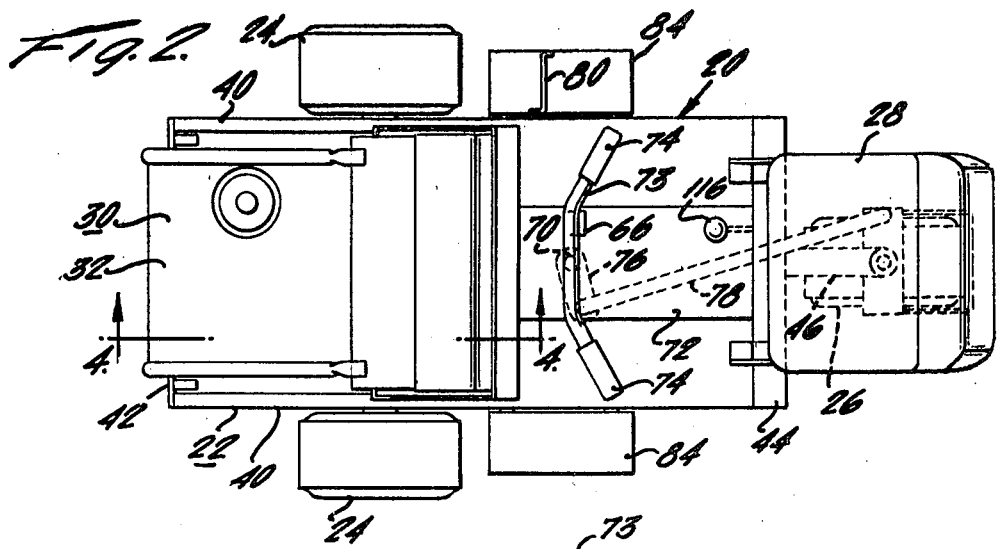
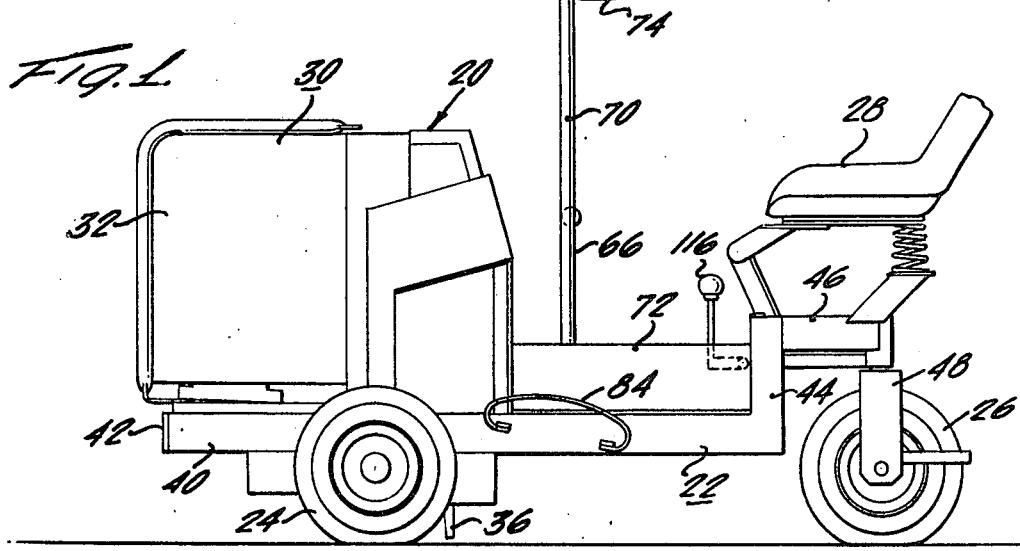
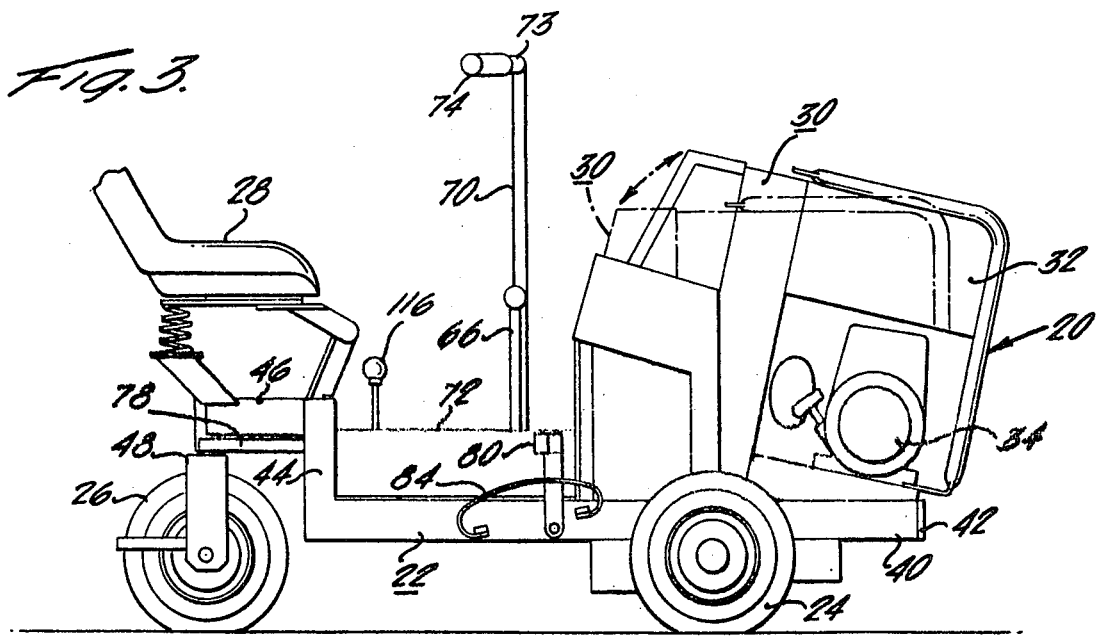

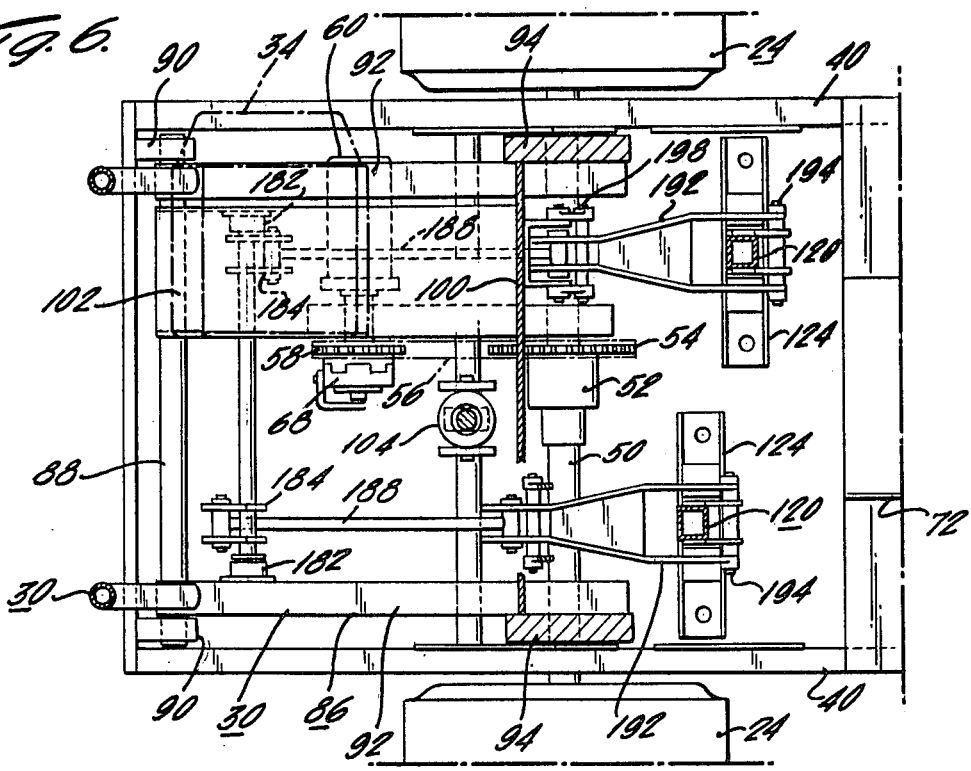
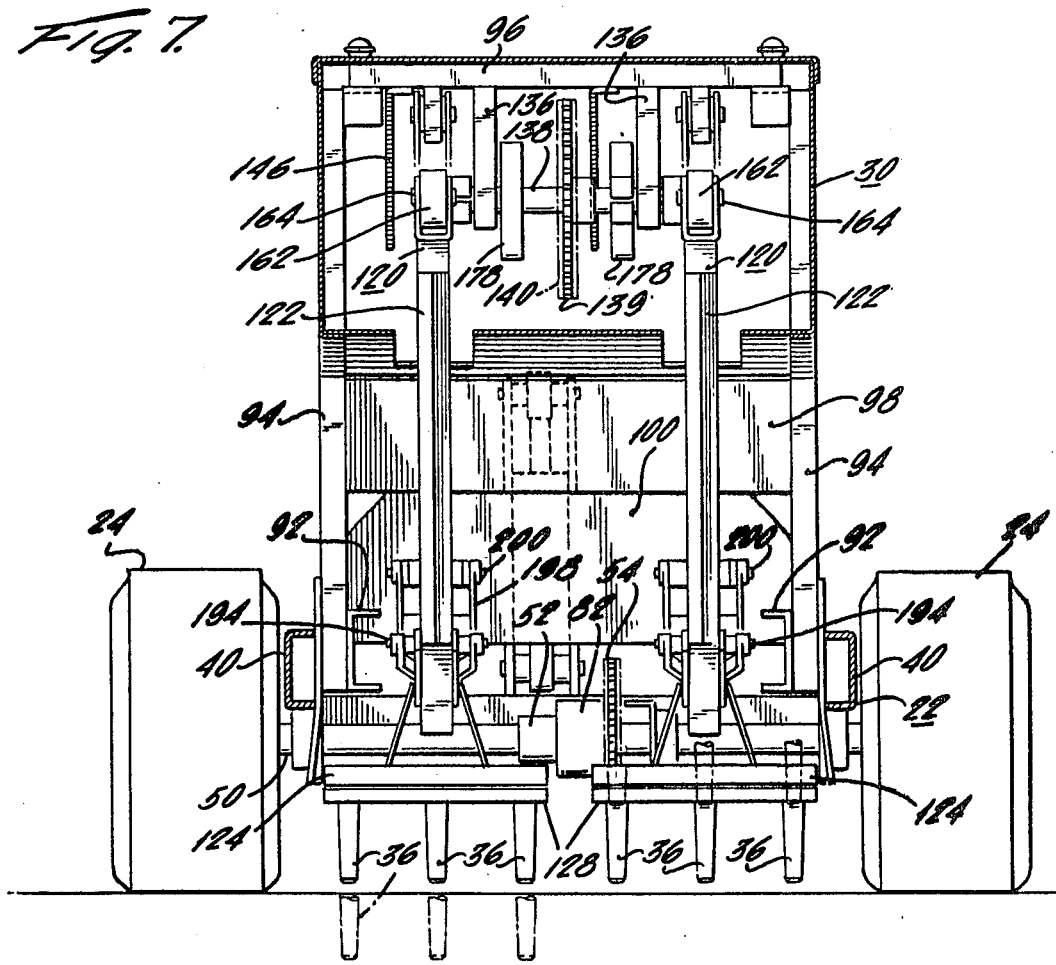

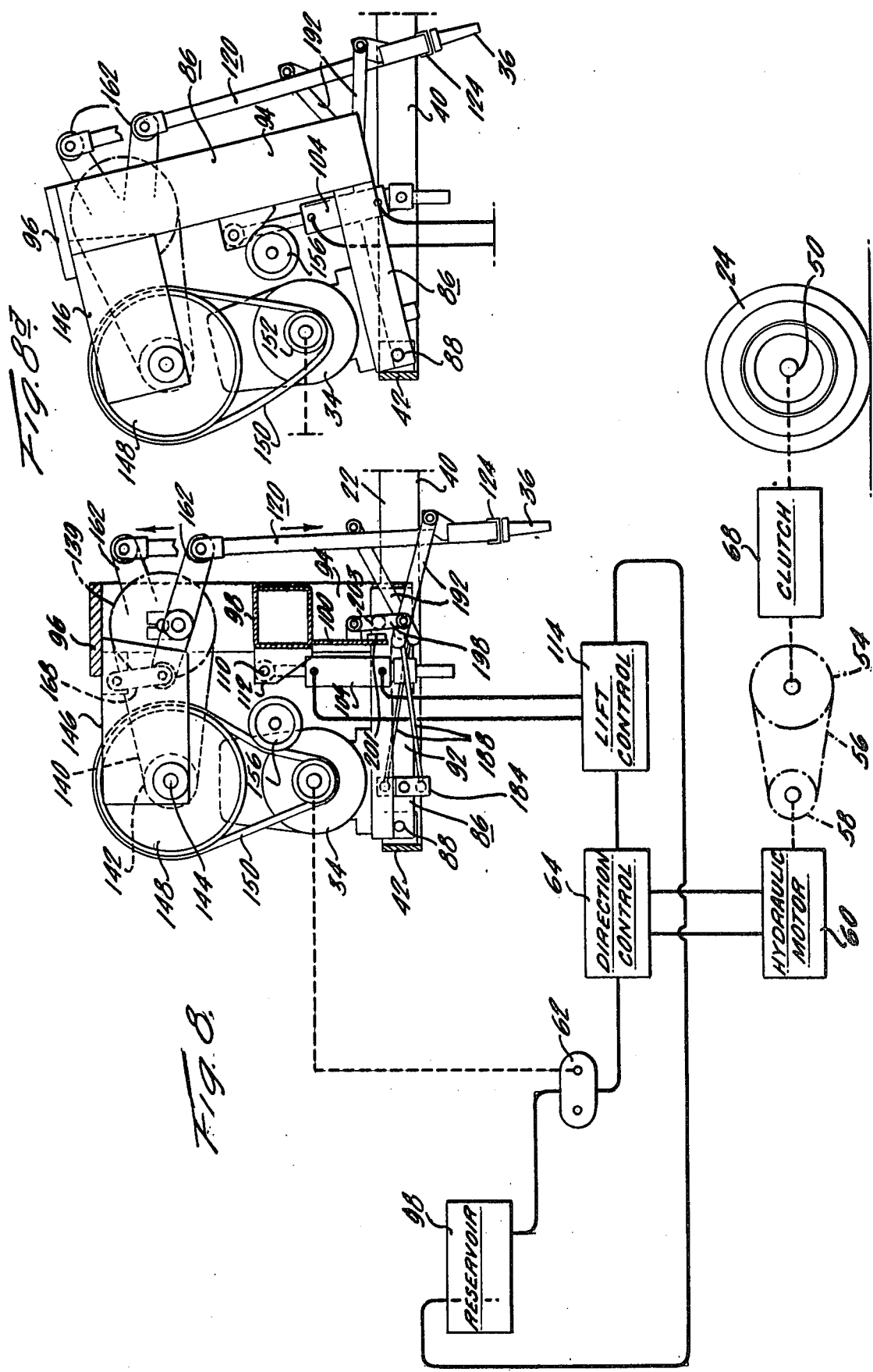

DRIVE MECHANISM FOR TURF AERATING APPARATUS

BACKGROUND OF THE INVENTION

The present invention relates generally to lawn maintenance equipment and relates more particularly to an apparatus for aerating turf by sequentially driving sets of coring tines into the ground to remove substantially cylindrical turf cores with a minimal disturbance of the surrounding turf area.

The importance of aerating lawns to permit water, oxygen and nutrients to reach the grass root region has been recognized for some time by experts in lawn care, particularly those involved in maintaining functional lawn areas such as golf courses, athletic fields, etc. A variety of types of equipment have been devised for aerating turf, some of which simply cut slits in the earth, while others either displace or remove small turf portions at spaced intervals.

Turf aerating equipment can basically be divided into two broad types, the simplest of which is the rotary type which typically involves a roller or rotatably mounted elements equipped with soil penetrating elements, which usually comprise disc-like knives, spoon tines or hollow coring tines. Although the knife-equipped roller type aerator provides a fairly clean slicing action of the turf, a rotary type device using fixed spoon tines or coring tines tends to disturb and tear up the area immediately surrounding the tine holes and thus is not suitable for critical lawn surfaces such as golf course greens.

A second and more complex type of aerating equipment is the reciprocating type which employs hollow coring tines which are driven substantially vertically into the ground in a reciprocating fashion. Such devices not only cause less damage to the surrounding lawn surface, but in addition are usually capable of achieving a deeper penetration of the soil than rotary type aerators. The present invention is directed to such a reciprocating type aerating device.

Since it would be impractical to stop the forward motion of the machine each time a set of tines was driven into the ground, reciprocating aerators must include a mechanism for accommodating the necessary relative horizontal movement of the tines and the aerator frame during turf penetration and for repositioning the tines preparatory to their next downward stroke. The aerator mechanism should, in addition, maintain a substantially vertical disposition of the tines during their contact with the ground.

In prior devices, these functions have been accomplished in several different ways. In an early form of aerating device, the vertically reciprocated tine arms were connected with a simple crank movement at their upper ends and spring loaded toward a stop plate at their lower ends such that engagement with the ground would extend the tension springs as the machine moved away from the ground engaging tines. Upon emergence of the tines from the ground, the springs would return the tine arms to a position against the stop ready for the next ground engagement. Although such a device provided the requisite relative movement between the tines and the machine frame, the arcuate movement of the tines while engaged with the ground resulting from the forward travel of the upper pivoted ends of the tine arms resulted in a substantial disturbance of the ground in the vicinity of the core holes. In addition, the sliding of the tine arms along guides and the impacting of the arms against the stop resulted in considerable friction, wear and a noisy operation of the device.

In an effort to overcome the shortcomings of the early reciprocating type aerators, later devices employed mechanisms for positively controlling the lower ends of the tine arms, such mechanisms being interconnected with the forward drive mechanisms of the machine to prevent tearing of the turf by the engaged tines.

In one popular device of this type, the vertically reciprocating tine arms are carried by slides which are oscillated horizontally by a rotating cam. While the cam and slide arrangement provides a reasonably good tine motion, the mechanism is complex, expensive to manufacture and maintain, and requires a significant amount of power to drive the slides, tine arms and tines in translational movement.

SUMMARY OF THE INVENTION

A turf aerating apparatus in accordance with the present invention includes a pair of substantially vertical tine arms each having a plurality of turf coring tines attached to the lower end thereof. A tine arm actuating mechanism comprising a crank-driven pitman arm pivotally connected at one end to an oscillating link and at the other end to the upper end of one of the tine arms is provided to impart an essentially elliptical motion to the upper end of each of the tine arms, the major axis of the elliptical motion lying in an essentially vertical plane.

The described mechanism is moved across the turf at a speed correlated with the elliptical path of movement of the upper tine arm so as to produce a modified cycloidal movement of the coring tines with respect to the turf. The elliptical motion imparted to the upper end of the tine arms maintains the tine arms in a substantially vertical disposition during engagement of the tines with the ground, and a tine arm return mechanism provides horizontal movement to the tine arm leaving the turf to return it to its near vertical starting position.

It is accordingly a first object of the present invention to provide a turf aerating apparatus of the reciprocating type for driving sets of hollow coring tines alternately into the turf with a minimal disturbance of the surrounding turf areas.

A further object of the invention is to provide a turf aerating apparatus as described wherein the tine arms are driven at their upper ends in an elliptical path to maintain a substantial vertical disposition of the tines during the turf coring cycle.

Another object of the invention is to provide an aerating mechanism as described characterized by a relatively simple mechanism which requires little maintenance, is economical to operate and maintain, and which is relatively quiet in operation.

Additional objects and advantages of the invention will be more readily apparent from the following detailed description of a preferred embodiment thereof.

BRIEF DESCRIPTION OF THE DRAWINGS

FIG. 1 is a left side elevational view of a turf aerating apparatus in accordance with the invention;

FIG. 2 is a top plan view of the turf aerating apparatus shown in FIG. 1;

FIG. 3 is a right side elevational view of the apparatus shown in FIGS. 1 and 2 showing the aerator mechanism in the raised transport position;

FIG. 6 is a view partly in section taken along line 6—6 of FIG. 4;

FIG. 7 is a view taken along line 7—7 of FIG. 4;

FIG. 8 is a schematic view showing the hydraulic control system;

FIG. 8a is a view similar to the upper right hand portion of FIG. 8 but showing the aerator mechanism in the raised transport position;

DESCRIPTION OF THE PREFERRED EMBODIMENT

Figure 5:
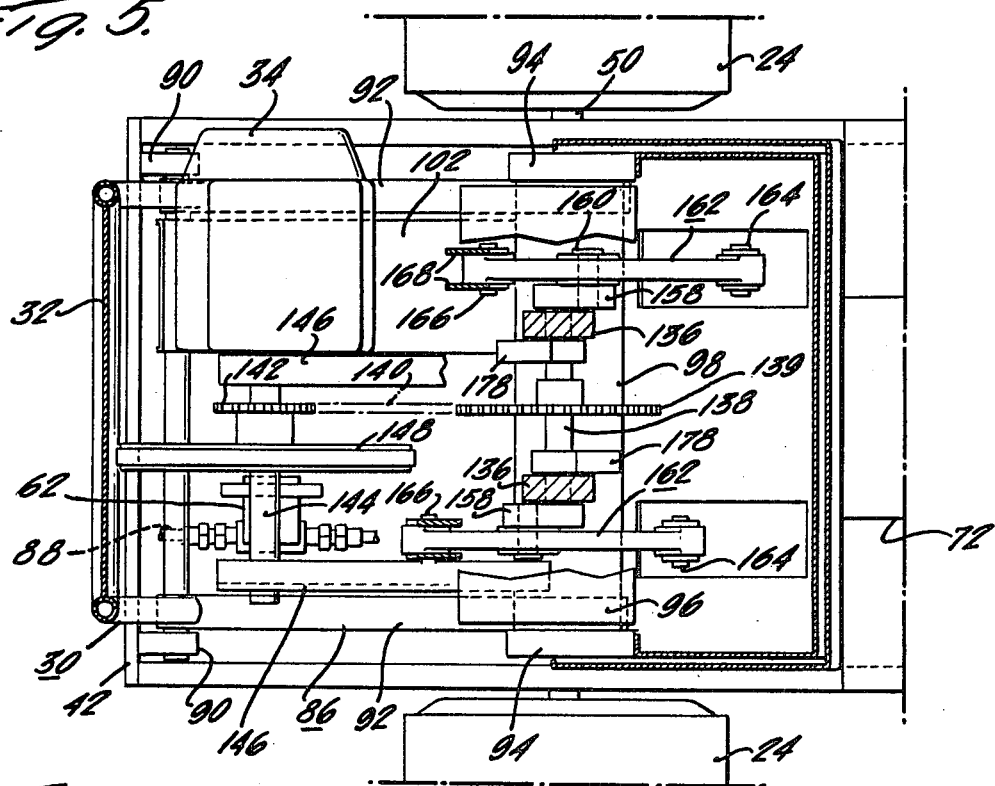
FIG. 5 is a view partly in section taken along line 5—5 of FIG. 4.

Referring to the drawings and particularly FIGS. 1-3 thereof, a turf aerating mechanism generally designated 20 in accordance with the present invention includes a frame assembly 22 which is supported for rolling movement across a turf area by a pair of rubber tired front wheels 24 and a single rubber tired rear steering wheel 26. The apparatus is self-propelled, being controlled by an operator seated in a seat 28 mounted on the rear of the frame. An aerator mechanism generally designated 30 is located over the front wheel axle and is enclosed by a hood assembly 32. An engine 34 mounted within the hood 32 provides power both to actuate the aerator mechanism as well as to drive the apparatus across the turf for either aerating operation, or transport to the aerating site.

During the aerating operation of the apparatus, the aerator mechanism functions to alternately drive two groups of hollow coring tines 36 into the turf in a reciprocating manner. The tines 36, which appear just behind the front wheel 24 in FIG. 1 and are more readily viewed in FIGS. 7 and 9, form a repeating pattern of holes 38 in the turf (FIGS. 9 and 10) by removing turf cores therefrom, the holes permitting the entrance of air, water and nutrients into the root areas of the turf.

For transport of the apparatus, the aerator mechanism 30 along with the engine 34 and housing 32 may be tilted forward to the transport position shown in solid lines in FIG. 3, thereby withdrawing the tines 36 from close proximity or engagement with the surface over which the apparatus is transported.

With the above general summary of the apparatus in mind, the specific details of the invention and particularly the novel aerator mechanism 30 thereof will be considered in detail.

The frame assembly 22 is essentially a rectangular framework formed by side frame members 40 connected at their forward ends by front frame member 42 and at their rearward ends by rear frame member 44, which, as shown in FIGS. 1 and 3, extends substantially above the side frame members. A rearwardly extending strut 46 secured to the rear frame member 44 adjacent the upper edge thereof provides a pivotal mounting for wheel yoke assembly 48 within which the rear wheel 26 is journaled.

Figure 4:
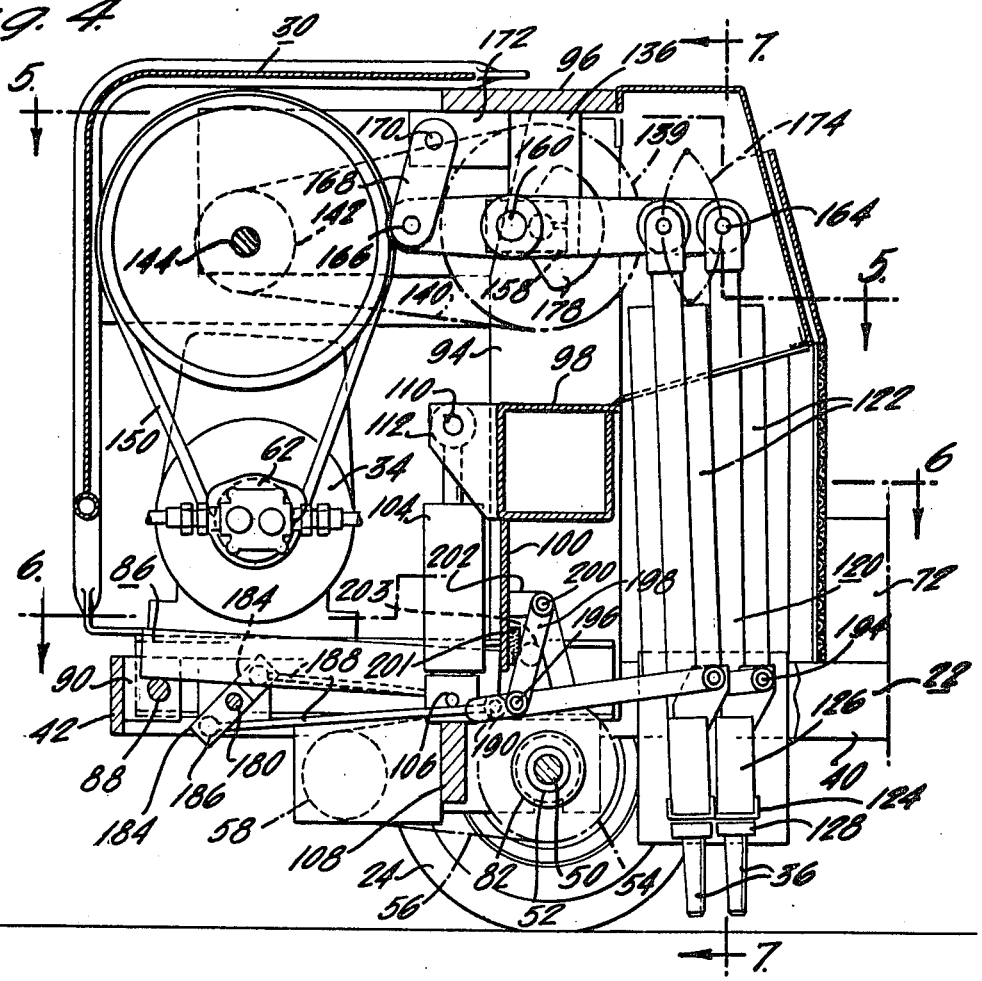
FIG. 4 is an enlarged sectional view taken along line 4—4 of FIG. 2 showing details of the aerating mechanism.

As shown in FIGS. 6 and 7, the front wheels 24 are mounted on an axle 50 attached to the side frame members 40. The axle 50 includes a differential assembly 52 through which the wheels 24 are driven by means of sprocket 54, drive chain 56, and drive sprocket 58 driven by hydraulic motor 60. As shown in FIGS. 4, 5 and the schematic view of FIG. 8, the hydraulic motor is powered by a pump 62 driven by the engine 34. Directional control of the wheel rotation is effected by means of control valve 64 which is actuated by control lever 66 at the operator's station. Clutch 68 (FIG. 8) is provided to permit disengagement of the hydraulic motor drive, for example to permit towing or manual rolling movement of the apparatus when the engine is not running.

Steering of the apparatus is accomplished by means of the vertical steering column 70 pivotally mounted on a central raised floor portion 72 of the frame assembly 22. The steering column at its upper end includes a transverse handle bar 73, the ends of which include hand grips 74 which are grasped by the operator to effect steering control. The lower end of the steering column beneath the floor member 72 includes a short transverse steering arm 76 extending from its left side and pivotally connected to the forward end of steering link 78. The rear end of link 78 is pivotally connected to the wheel yoke assembly 48 at a point transversely spaced from its vertical pivot and on the right side thereof. The turning of the handle bar 72 in a clockwise direction will accordingly produce a counterclockwise rotation of the rear steering wheel 26 and turn the apparatus toward the right. A counterclockwise rotation of the handle bar will, of course, have the opposite effect and turn the apparatus to the left. The employment of a single rear steering wheel provides a very short turning radius and a high degree of maneuverability of the apparatus.

Although the unit is hydraulically locked when the control lever 66 is shifted to a neutral position, supplemental braking means are provided for safety purposes to protect against hydraulic or mechanical system failure when loading or unloading the unit from trailers or trucks. This supplemental braking means comprises a brake pedal 80 (FIG. 3) which actuates a brake band disposed around a brake drum portion 82 of the front axle drive sprocket 54. (FIG. 6). The brake band and linkage are not shown in view of their conventional construction. Foot rests 84 are mounted outboard of the side frame members 40 on each side of the frame, the right hand foot rest underlying the brake pedal 80.

The aerator mechanism 30 as well as the engine 34 is mounted on an aerator frame assembly generally designated 86 which is pivotally mounted on a transverse shaft 88 journaled in spaced ears 90 attached to the front frame member 42 as shown in FIGS. 4-6. The aerator frame 86 comprises a pair of spaced side rails 92 attached at their forward ends to the shaft 88 and which at their rear ends connect with opposed vertical frame members 94 as most clearly seen in FIGS. 6 and 7. The opposed vertical frame members 94 are joined at their upper ends by a top frame member 96 and in addition are joined at an intermediate point by transverse tubular frame member 98 as shown most clearly in FIGS. 4 and 7. The aerator frame further includes a transverse frame panel 100 extending between the vertical frame members 94 beneath the forward edge of the tubular member 98. An engine mounting plate 102 supported at its forward end on the shaft 88 is attached at its rear end to the lower end of the panel 100. The engine 34 is secured to the engine mount 102 and accordingly pivots with the aerator frame assembly when the assembly is raised or lowered.

The mechanism for raising or lowering the aerator frame and the aerator components carried thereby comprises a hydraulic piston-cylinder actuator 104 which is pivotally connected at its lower end 106 to a support bracket disposed on transverse frame member 108 extending between the side frame members 40. The upper piston rod end of the actuator 104 is pivotally connected at 110 to a bracket 112 mounted on the front face of tubular frame member 98 of the aerator frame assembly. As shown in FIG. 8, the actuator 104 is controlled by a lift control valve 114 to supply hydraulic fluid under pressure from pump 62. The valve 114 is controlled by the machine operator by means of lift control lever 116 as shown in FIGS. 1-3. The aerator frame assembly 86 is shown in the raised position in FIGS. 3 and 8a.

Figure 9:
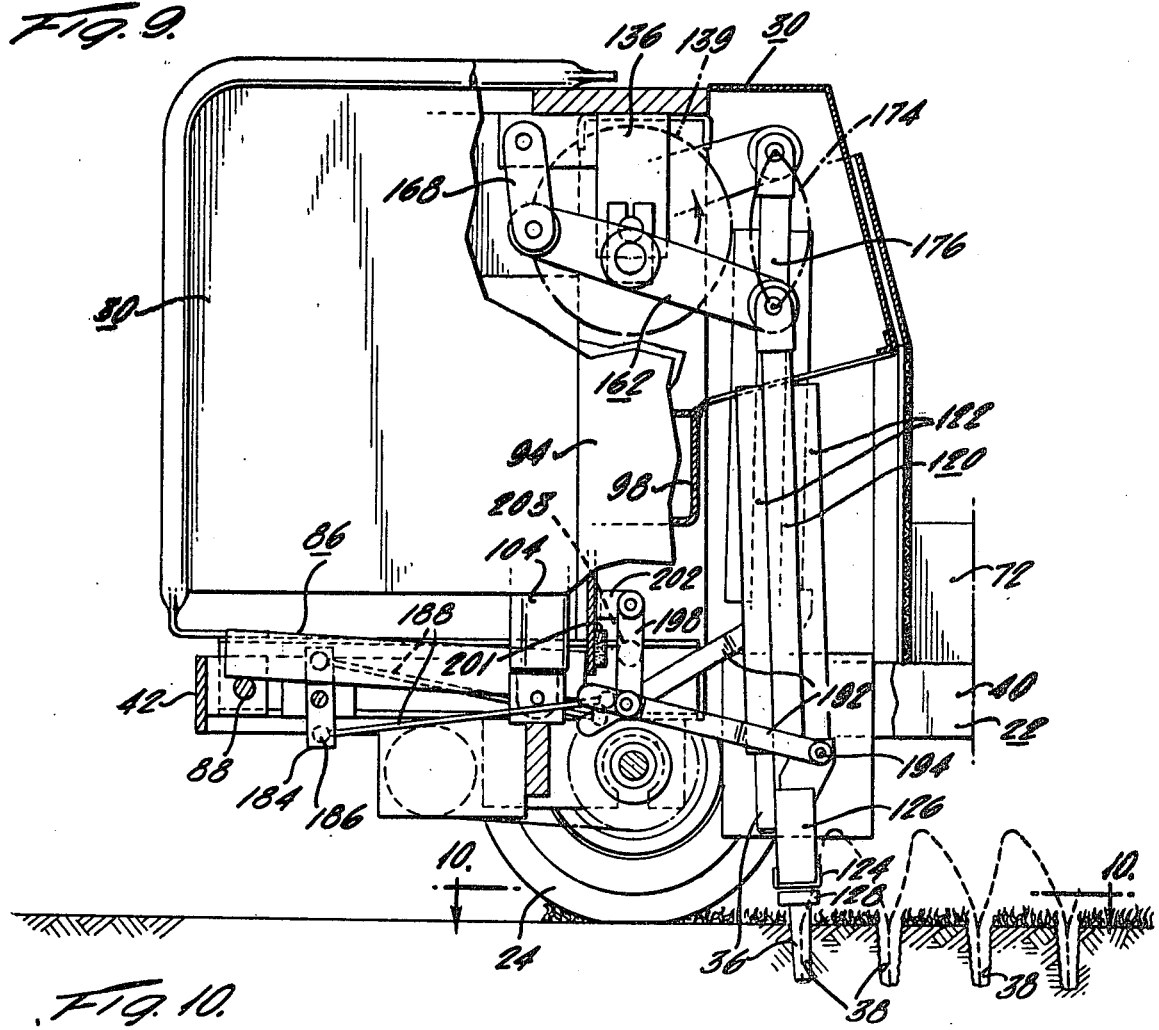
FIG. 9 is a partial left hand elevational view of the aerator mechanism showing in elevation the pattern produced by the turf coring tines.
Figure 10:
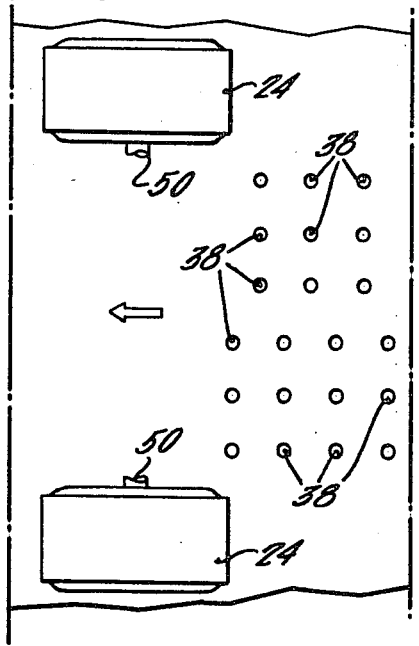
FIG. 10 is a view taken along 10—10 of FIG. 9 showing the plan pattern of the coring tines in the turf engaged by the aerating apparatus.
Figure 12:
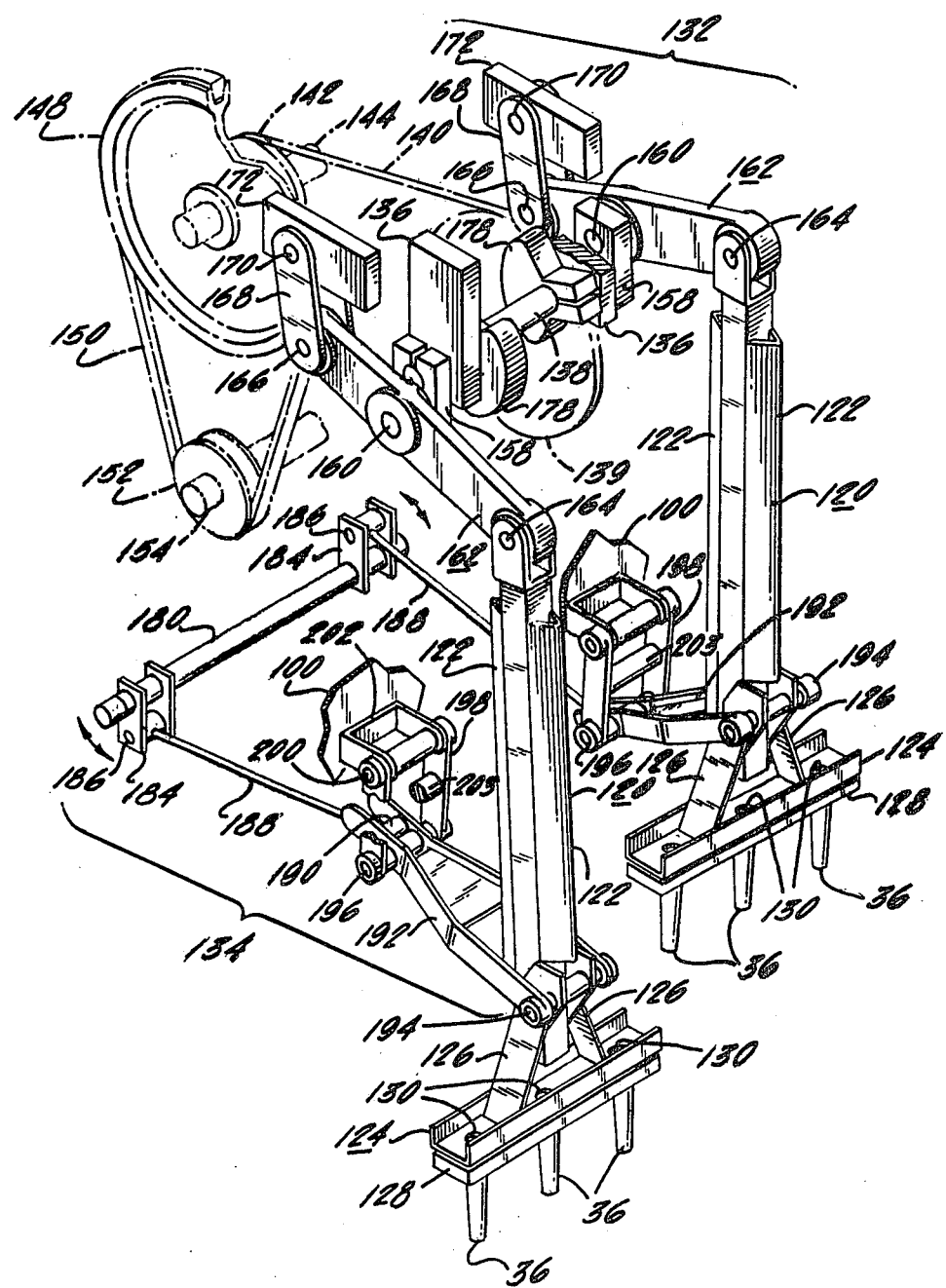
FIG. 12 is an enlarged isolated perspective view of the operating components of the turf aerator mechanism.

The aerator mechanism 30 functions to impart a driving force to the two groups of coring tines 36 in alternate ground penetrating strokes to produce the repeating aeration pattern shown in FIGS. 9 and 10. As shown most clearly in FIGS. 7 and 12, the tines 36 are arranged in two groups of three, each group extending downwardly from one of two identical tine arms 120. The tine arms 120 comprise vertically oriented square tube members having stiffening elements 122 extending partway along their length. The tines are connected to the lower end of the tine arms by means of transverse channels 124 secured to the tine arms by brackets 126. The upper ends of the tines are flared and seat within tapered apertures in tine holding bars 128 which are bolted to the channel members 124 (bolts not shown). Apertures 130 in the channel members 124 aligned with the tines permit passage of the turf cores which move upwardly through the tines as the tines are driven downwardly into the turf.

The movement of the tine arms 120 is controlled by an engine driven tine arm actuating mechanism generally designated 132 connected with the upper ends of the tine arms, and a tine arm return mechanism 134 connected to the lower ends of the tine arms. The tine arm actuating mechanism functions primarily to impart a vertical movement to the tine arms, while the return mechanism functions to correctly position the lower ends of the tine arms horizontally preparatory to their next ground engaging strokes. The return mechanism is not engine driven, but instead derives its motive force from the relative movement of the apparatus and the tine arm engaged with the turf.

Considering first the tine arm actuating mechanism 132, this mechanism is disposed immediately beneath and supported by the top frame member 96. As shown in FIG. 7, a pair of spaced downwardly extending shaft support members 136 are apertured and provided with bearings to rotatably support a horizontally disposed crank shaft 138. The crank shaft includes a sprocket 139 keyed thereto, which sprocket is driven by chain 140 from a smaller sprocket 142 keyed to a shaft 144 carried by spaced parallel cantilevered support brackets 146 extending forwardly from the undersurface of the top frame member 96. A large sheave 148 also keyed to the shaft 144 is connected by drive belt 150 to a drive sheave 152 mounted on the drive shaft 154 of the engine 34. This drive arrangement for the crank shaft is most readily viewed in FIGS. 8, 8a, and FIG. 12.

As shown in FIG. 8, an idler 156 bears against the belt 150 when the aerator frame is in the lowered aerating position, thereby tensioning the belt and providing a driving rotation of the sheave 148, shaft 144, sprocket 142 and the sprocket 139 through the drive chain 140. The idler 156 is mounted on a strut (not shown) extending from the fixed transverse frame member 108. Accordingly, when the aerator frame 86 is raised as shown in FIG. 8a, the idler 156 no longer engages the belt 150, allowing sufficient slack to develop to prevent the driving of the tine acutating mechanism.

A pair of cranks 158 extend in diametrically opposed relation at the opposite ends of the crank shaft 138. Crank pins 160 extending from the cranks drive a pair of pitman arms 162, being journaled therewithin at a point intermediate the pitman arm ends. The rearward end of each pitman arm is pivotally connected at 164 to the upper end of one of the tine arms 120. The forward ends of the pitman arms are pivotally connected at 166 to a pair of pitman links 168 which in turn are pivotally attached at 170 to a pair of support members 172 mounted beneath top frame member 96.

When the aerator frame is disposed in the lowered operating position, the idler 156 will engage the drive belt 150, resulting in rotation of crank shaft 138 and a driving of the pitman arms 162. The pitman links rock in an oscillating motion, producing an elliptical movement of the rearward ends of the pitman arms and the tine arm upper ends as shown by the broken line path at 174 in FIGS. 4 and 9. As shown in that view, the major axis 176 of the elliptical path lies in a substantially vertical plane.

In order to dynamically balance the moving masses of the tine actuating mechanism, counter weights 178 are mounted on the crank shaft 138.

The tine arm return mechanism 134 includes a rocker shaft 180 pivotally mounted at its ends by bearing assemblies 182 on the aerator frame side rails 92 as shown in FIG. 6. A pair of rocker arms 184 extend in diametrically opposed relation from the rocker shaft 180 adjacent the ends thereof. The rocker arms, each of which comprises a pair of spaced plates, are pivotally connected at 186 to a pair of rocker links 188 which at their opposite ends are pivotally connected at 190 to the forward ends of a pair of return links 192. Each of the return links is pivotally connected at 194 to the lower end of the tine arms 120 and specifically to the bracket 126 thereof. The return links 192 are pivotally connected at 196 to a pair of vertical links 198 which in turn are pivotally connected at 200 to brackets 202 mounted on the rear face of frame panel 100 as shown in FIG. 4. A pair of rubber stops 201 on the rear face of frame panel 100 are engageable by stop bars 203 extending across each pair of vertical links 198 to limit the forward movement of the vertical links, the return links 192 and the lower ends of the tine arms 120.

The tine arm return mechanism is not engine driven but is actuated by the relative movement of the aerating apparatus with the ground. As one of the tine arms is introduced into the turf, the forward movement of the machine will produce a resultant rotation of the rocker shaft through the return link, rocker link and rocker arm connection thereto with the lower end of the turf-engaged tine arm. The lower end of the free tine arm by virtue of its connection to the rocker shaft will be drawn forwardly preparatory to its turf-engaging stroke. The movement of the rocker shaft 180 is an oscillating movement as may be seen from a comparison of FIGS. 4 and 9. In FIG. 4, one of the tine arms has just been withdrawn from the turf and the other arm is about to enter the turf. In FIG. 9, one of the tine arms has reached its full depth in the turf while the other arm is in the fully raised position and in the process of being moved forwardly by the tine return mechanism.

For operation of the apparatus, the clutch 68 is engaged and the engine 34 started. By means of the lift control lever 116, the operator actuates the lift control valve 114 to raise the aerator mechanism to the elevated inactive position shown in FIGS. 3 and 8a. The operator then by means of control lever 66 actuates the direction control valve 64 to power the hydraulic motor 60 and drive the front wheels 24.

Upon arrival at the site where aeration is to take place, the operator moves the control lever 116 to actuate valve 114 to effect a lowering of the aerator mechanism to the operating position as shown for example in FIGS. 8 and 9. As indicated above, the lowering of the aerator mechanism automatically starts the tine arms in motion by engaging the idler 156 with the belt 150. The repricatory motion of the tine arms commences and the operator need only steer the apparatus along the desired course to produce the aerating pattern shown in FIG. 10. Upon completion of the aerating operation, the lever 116 is again actuated to raise the aerating mechanism, thereby simultaneously stopping the tine arm drive by allowing belt 150 to go slack on the drive sheave and raising the tines 36 to prevent engagement with the turf during transport.

The present tine arm actuating mechanism by providing an elliptical path of the upper ends of the tine arms maintains the tine arms in substantially vertical relation during their ground penetrating stroke. The benefit obtained can be readily seen in FIG. 4 wherein one of the tine arms is shown halfway through its ascending stroke while the other tine arm is halfway through its descending stroke. The tine arms are substantially parallel and substantially vertical but are transversely offset a distance comparable to the pitch of the tine holes 38. The rotation of the crank shaft is counterclockwise as viewed in FIG. 4 and hence the rearmost tine arm is in the ascending mode while the foremost tine arm is poised for turf engagement.

The tine arm return mechanism, being essentially a free-swinging linkage, ensures that once a set of tines is engaged with the turf, there are no forces tending to laterally move the tines and disturb the adjacent turf. Accordingly, the tine arm return mechanism provides considerable flexibility of operation and permits accommodation for minor turning movements of the apparatus.

The speed of the apparatus drive provided by the hydraulic motor 60 is correlated with the speed of the tine arm actuating mechanism and the permissible range of the tine arm return mechanism. Although the selection of an appropriate speed ratio for the tine arm drive and apparatus wheel drive is necessary to optimize the aerating effect, it is not as critical as in prior art devices. Minor changes in the speed ratio would primarily effect the spacing of the holes 38 in the turf, a faster wheel speed producing a greater spacing and a slower wheel speed a closer spacing of the holes.

Figure 11:
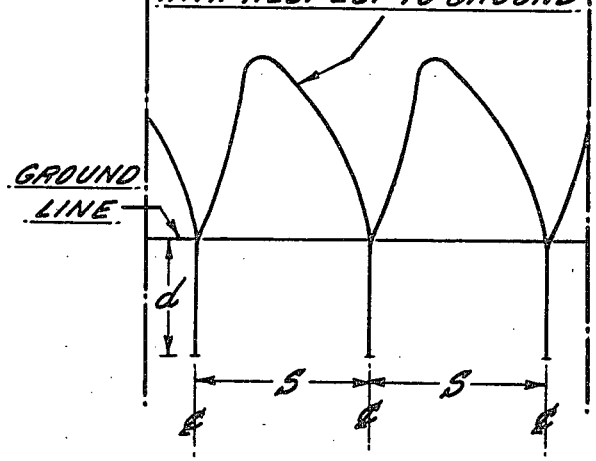
FIG. 11 is a schematic view showing the path of the lower end of the tines with respect to the ground during the coring cycle.

In FIG. 11, the path of the lower ends of a set of tines is schematically illustrated. The motion of the tines during penetration and withdrawal is essentially vertical, the tines penetrating a distance "d" into the ground with a spacing "s" between turf penetrating strokes. The essentially vertical movement of the tine end during ground penetration coupled with the substantially vertical attitude of the tine arm during the ground penetrating stroke ensures a clean coring of the turf with a minimal disturbance of the surrounding turf area.

Although the aerating mechanism has been illustrated and described with respect to a riding type of apparatus, it will be recognized that a cart type arrangement utilizing the present aerator mechanism and wherein the operator walks rather than rides could also be employed in the context of the invention.

Manifestly, changes in details of construction can be effected by those skilled in the art without departing from the invention.

I claim:

1. A drive mechanism for turf aerating apparatus of the type including an aerator frame and a pair of substantially vertical tine arms associated with said frame for reciprocating movement with respect thereto, each of the tine arms having a plurality of downwardly directed turf coring tines disposed on the lower end thereof, said drive mechanism comprising a tine arm actuating mechanism for imparting an elliptical motion to the upper ends of each of said tine arms, said mechanism including a crank shaft rotatably mounted on said aerator frame, means for rotating said crank shaft, a pair of cranks secured to said crank shaft and extending therefrom in diametrically opposed relation, a pair of pitman arms, each said pitman arm being rotatably connected at an intermediate point thereon to one of said cranks, one end of each said pitman arm being pivotally connected to the upper end of one of the tine arms, the other end of each of said pitman arms being pivotally connected to a pitman link which in turn is pivotally connected to said aerator frame, the rotation of said crank shaft driving said pitman arms to impart an elliptical motion to the upper ends of said tine arms with the major axis of the motion ellipse lying in a substantially vertical plane.

2. Turf aerating apparatus comprising a frame, means supporting said frame for rolling movement across a turf area, means for driving said supporting means to move said frame across the turf, an aerator mechanism mounted on said frame comprising a pair of substantially vertical tine arms, each said tine arm having a plurality of downwardly directed turf coring tines disposed on the lower ends thereof, said aerator mechanism including tine arm actuating means for alternately driving said tines into the turf, said tine arm actuating means comprising a crank shaft rotatably mounted on said aerator frame, means for rotating said crank shaft, a pair of cranks secured to said crank shaft and extending therefrom in diametrically opposed relation, a pair of pitman arms, each said pitman arm being rotatably connected at an intermediate point thereon to one of said cranks, one end of each said pitman arm being pivotally connected at the upper end of one of said tine arms, the other end of each of said pitman arm being pivotally connected to a pitman link which in turn is pivotally connected to said frame, the rotation of said crank shaft driving said pitman arms to impart an elliptical motion to the upper ends of said tine arms with the major axis of the motion ellipse lying in a substantially vertical plane, said aerator mechanism further including a tine arm return mechanism for alternately returning the lower ends of said tine arms to a forward position following each ground penetrating stroke.

* * * * *